United States Patent [19]
Reitman

[11] 3,766,939
[45] Oct. 23, 1973

[54] FLOAT VALVE IMPROVEMENT
[76] Inventor: Abraham Isadore Reitman, Oakland, Calif.
[22] Filed: Mar. 22, 1972
[21] Appl. No.: 236,837

[52] U.S. Cl................... 137/434, 137/448, 285/177
[51] Int. Cl............................................. F16k 31/18
[58] Field of Search.................... 137/216, 218, 114, 137/115, 270, 434, 316, 426, 435–438, 448; 285/12, 176, 177

[56] References Cited
UNITED STATES PATENTS
3,097,000  7/1963  McClintock et al............ 285/177 X
3,543,786  12/1970  Woodford............................ 137/218
3,584,642  6/1971  Wilson................................. 137/270

Primary Examiner—Martin P. Schwadron
Assistant Examiner—D. R. Matthews
Attorney—Robert R. Tipton

[57] ABSTRACT

A float valve is provided in which the inlet fitting is adapted to receive different sizes of conduits and prevent syphoning of liquid back into the liquid supply system and which also includes a foraminous float protector functioning also to hold the valve in the closed position.

7 Claims, 3 Drawing Figures

PATENTED OCT 23 1973  3,766,939

FLOAT VALVE IMPROVEMENT

BACKGROUND OF THE INVENTION

This invention relates to float valves and in particular to fittings for float valves.

Float valves which are intended for use on ranches, farms or other locations which are remote must be simple in construction and easy to maintain and operate with a minimum of tools, for example, a float valve such as that illustrated in U.S. Pat. No. 3,485,261 issued to the above inventor on Dec. 23, 1969.

Such valves of the prior art are generally equipped with one size of entrance fitting making it necessary to keep a supply of adaptors of various sizes of pipe or hose connection since the size of an inlet pipe or hose is not always known or whether a pipe or hose fitting will be used or available.

Furthermore, if the tank in which the valve is installed requires maintenance, usually a hand operated valve must be installed in the inlet pipe to shut off the liquid when there is no liquid in the tank to operate the float.

Also, where floating solid material may be present in the liquid in the tank or animals are feeding near the valve, the float may be jammed or damaged by such debris and animals.

SUMMARY OF THE INVENTION

The apparatus of the present invention eliminates the requirement for extra adaptors by providing an inlet fitting adapted to receive more than one size or type of inlet conduit and protects the float by providing a float guard which also serves to control the operation of the float valve when no liquid is present to operate the float.

It is, therefore, an object of the present invention to provide a float valve in which inlet conduits of different sizes and types can be connected.

It is another object of the present invention to provide a float valve incorporating anti-syphon means.

It is also another object of the present invention to provide a float valve in which the float is protected.

It is a further object of the present invention to provide a float valve in which the valve can be mechanically held in the closed position in the absence of a float actuating liquid.

These and other objects of the present invention will be manifest upon careful study of the following description when taken together with the drawings.

BRIEF DESCRIPTION OF THE DRAWINGS

With reference to FIG. 1, the float valve apparatus of the present invention comprises, basically, a housing 10 having a bottom opening 11 which communicates with the liquid whose level is to be controlled, with an inlet fitting 12 attached to the top of housing proximate one end.

Figure 1:
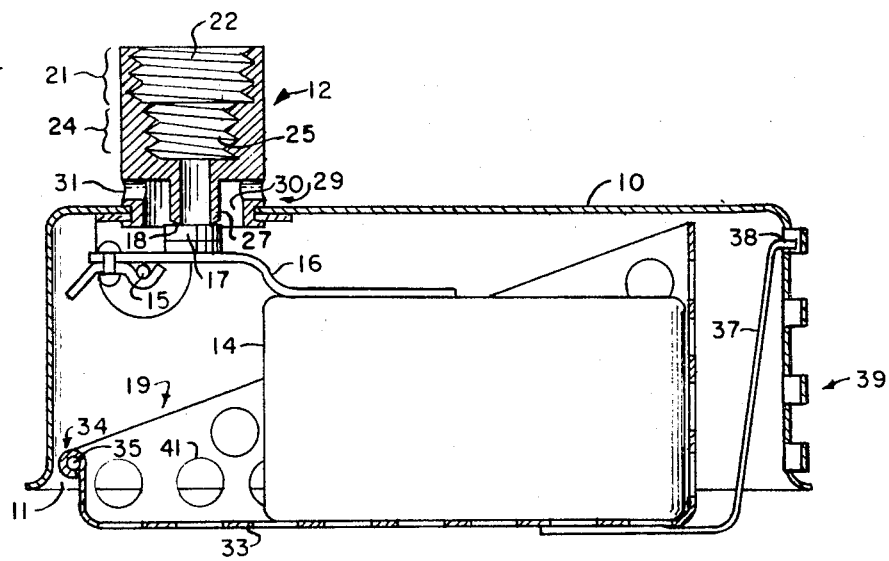
FIG. 1 is an elevational sectional view of the apparatus of the present invention showing the valve in the closed position.

A float 14 is also provided which is pivotally connected to housing 10 by pin 15 and float arm 16. A gasket 17 is connected to float arm 16 which is adapted to engage the edges of exit port 18 of fitting 12 to form a seal and stop the flow of liquid from fitting 12 into housing 10.

A foraminous guard member 19 is arranged to be pivotally connected to housing 10 and adapted to prevent floating debris from entering bottom opening 11 and also protect float 14 from damage or from being operated by things other than the liquid whose level is to be controlled.

Still, with reference to FIG. 1, and in particular, with reference to inlet fitting 12, fitting 12 comprises a first connector section 21 having threads 22 adapted to receive one pipe or hose fitting size, and a second connector section 24 whose axis is colinear with first connector section 21 and having threads 25 adapted to receive a second and smaller pipe or hose fitting size.

Thus, the user of the float valve of the present invention is not required to carry with him a large variety of adaptors should he desire to fit either a pipe or hose to inlet fitting 12.

It will be noted that fitting 12 further comprises an orifice 27 having an exit port 18, the edges of which are adapted to engage and receive gasket 17 to form a liquid tight seal when gasket 17 is held against exit port 18.

It should be further noted that, in order to prevent any liquid contained in housing 10 from being sucked or syphoned back into the inlet liquid supply through fitting 12, an anti-syphon venting means 29 is incorporated into fitting 12 which comprises an annular vent cavity 30 opening into the top of housing 10 concentrically disposed around orifice 27 and communicating with the atmospheric pressure outside of housing 10 by means of a plurality of vent holes 31.

Should there be a loss of liquid pressure in the pipe connected to fitting 12, any negative pressure occurring at exit port 18 is relieved by air entering from vent 31 into cavity 30 and from there into port 18 of orifice 27.

To facilitate connection of a hose or pipe to fitting 12, fitting 12 is loosely connected to housing 10 to allow it to swivel.

Guard 19, besides providing protection for float 14, also functions to cooperate in the functioning of inlet fitting 12 by providing a means for holding gasket 17 against port 18 and thus maintain the valve in the off position in the absence of a float actuating liquid.

Guard 19 comprises a foraminous member 33 formed at one end to define a hinge or pivot 34 which is pivotally connected to housing 10 by pin 35 permitting guard 19 to rotate up and down about pivot 34.

Although member 33 has been described as foraminous, such member can include within its definition a member that is open at the top and having solid sides with an opening in the bottom to permit inflow and outflow of float actuating fluid.

An operating handle or ratchet 37 is attached to the end of guard 19, as by welding or the like, opposite pivot 34, and is provided with a tooth 38 which is adapted to engage catch 39 formed in housing 10 to hold guard 19 in a fixed position.

Figure 3:
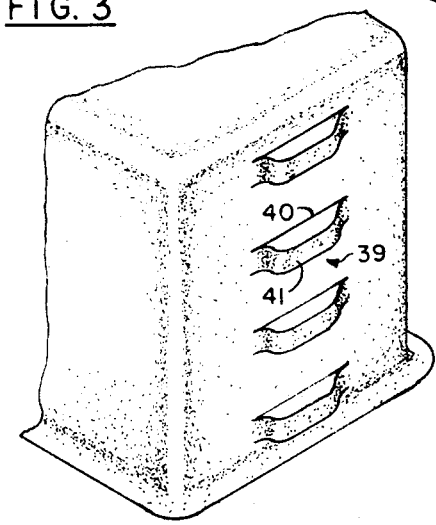
FIG. 3 is an isometric view of the end of the housing showing the catches or latching arrangement.

Catches 39 are illustrated in greater detail in FIG. 3 and comprise a handle engaging slot 40 which is left after shearing and partial extrusion of extruded member 41. Extruded member 41 acts to guard against action directly on tooth 38 which would release handle 37 from catch 39.

Handle 37 is preferably fabricated from a resilient material such as spring steel or the like, to permit release and rotation of guard 19 by merely pulling handle 37 away from housing 10 and moving guard 19 up or down.

Figure 2:
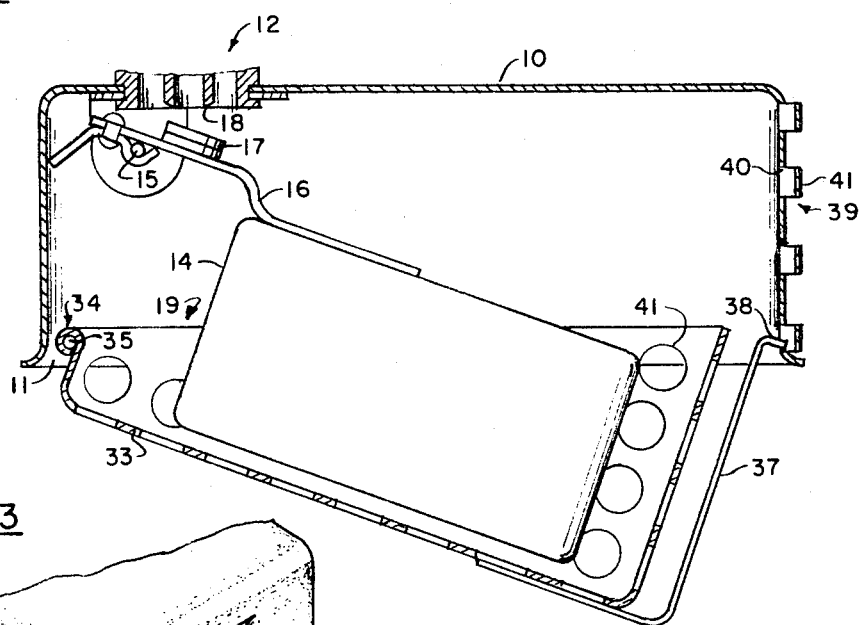
FIG. 2 is an elevational sectional view of the apparatus of the present invention showing the valve in the open position.

Although foraminous member 33 is shown in FIGS. 1 and 2 as comprising a plurality of circular holes or openings 41 which allow liquid to flow in and out of housing 10, member 33 may also be fabricated from any other foraminous material such as wire screen or the like, or solid sides with openings at the top and bottom as described above, whichever offers the best physical protection and manufacturing capability.

To operate the float valve of the present invention, a hose or pipe conveying liquid, usually water, to the valve, is connected to inlet fitting 12, with the valve installed in a tank (not shown) in which the water level is to be controlled. Installation can be by hangers (not shown) attached to housing 10 and adapted to fasten to the tank.

With handle 37 and guard 19 placed in the position shown in FIG. 1, gasket 17 is forced or biased against the edges of exit port 18 thus cutting off the flow of water through orifice 27 into housing 10.

By pushing handle 37 away from housing 10 (to the left in the drawing) a sufficient amount to release tooth 38 from catch 39, guard 19 can be lowered to the position shown in FIG. 2 until the tooth 38 engages the lowest catch 39.

When in this position (FIG. 2) float 14 is thus allowed to pivot down to release gasket 17 from its seal on exit port 18, thus permitting water to flow into housing 10 and out through holes 41 in foraminous member 33 into the tank (not shown) being filled.

Should it be desired to regulate the rate of flow of water entering housing 10, guard 19 can be raised, again using handle 37 in the manner previously described, to allow any of catches 39 intermediate between the bottom and top catch to engage tooth 38 so that float 14 is adjusted to in turn adjust the position of gasket 17 so that it partially restricts the flow of water out of exit port 18.

Thus is provided an improved float valve having means for connecting several sizes and types of inlet conduits, an anti-syphon means and a means for protecting the float and mechanically holding the valve closed in the absence of a float actuating liquid.

I claim:

1. In a float operated valve having means defining a float housing including means defining an opening in communication with a float actuating liquid, means defining an inlet port for a liquid attached to said housing, a float pivotally connected to said housing and means for opening and closing said inlet port connected to said float, the improvement comprising
    means for preventing floating debris from entering said housing and for protecting said float, and means for holding said means for opening and closing said port in the closed position.

2. The float operated valve as claimed in claim 1 wherein said means for preventing floating debris from entering said housing comprises means defining a foraminous member generally covering said opening in said housing in communication with a float actuating liquid and means for holding said means for opening and closing said port in the closed position.

3. The float operated valve as claimed in claim 2 wherein said foraminous member further comprises a pivot, pivotally connecting said foraminous member to said housing.

4. The float operated valve as claimed in claim 3 wherein said foraminous member is disposed to engage and operate said float and further comprises means for holding said foraminous member against said float and means for hold said means for opening and closing said port in the closed position.

5. In a float operated valve having means defining a housing including means defining an opening in communication with a float actuating liquid, means defining an inlet port for a liquid attached to said housing, a float pivotally connected to said housing and means for opening and closing said inlet port connected to said float, the improvement comprising
    a connector fitting attached to said housing and comprising means defining a first connnector section adapted to receive one type of connector device, and
    means defining a second connector section for use when said first connector section is not in use and adapted to receive a type of connector device different from that type received by said first connector section, the axis of said first and second connector sections being colinear.

6. The float operated valve as claimed in claim 5 wherein said means for connecting an inlet conduit further comprises
    a liquid tight seal attached to said means for opening and closing said inlet port,
    means defining an orifice having edges adapted to receive said liquid tight seal and disposed below said colinear connector sections, and
    means defining a vent in said connector fitting having at least one opening of said vent disposed adjacent said orifice in communication with the inside of said housing and at least one other opening of said vent in communication with the outside of said housing.

7. In a float operated valve having means defining a housing including means defining an opening in communication with a float actuating liquid, means defining an inlet port for a liquid attached to said housing, a float pivotally connected to said housing and means for opening and closing said inlet port connected to said float, the improvement comprising
    a connector fitting attached to said housing and comprising means defining a first connector section,
    means defining a second connector section, the axis of said first and second sections being colinear,
    means for preventing floating debris from entering said housing and protecting said float, and
    means for holding said means for opening and closing said port in the closed position.

* * * * *